United States Patent [19]

Szilva

[11] 4,004,858

[45] Jan. 25, 1977

[54] ADJUSTABLE BORING BAR PROVIDED WITH HARD METAL SHIFTING TIP FOR METAL WORKING

[75] Inventor: Andras Szilva, Jaszbereny, Hungary

[73] Assignee: Apritogepgyar, Jaszbereny, Hungary

[22] Filed: May 2, 1975

[21] Appl. No.: 573,990

[30] Foreign Application Priority Data

May 3, 1974  Hungary .............................. AI 234

[52] U.S. Cl. .................................. 408/153; 29/96
[51] Int. Cl.² ........................................ B23B 29/10
[58] Field of Search .............. 29/96; 408/186, 185, 408/153, 156, 199

[56] References Cited

UNITED STATES PATENTS

| 2,231,469 | 2/1941 | Hassig | 408/153 |
| 2,998,736 | 9/1961 | Cloutier et al. | 408/153 |
| 3,013,450 | 12/1961 | Yogus | 408/153 |
| 3,433,104 | 3/1969 | Milewski et al. | 408/156 |
| 3,704,958 | 12/1972 | Gulibon et al. | 408/153 |
| 3,801,213 | 4/1974 | Eversole | 408/185 X |

FOREIGN PATENTS OR APPLICATIONS 228,863  6/1960  Australia ............................ 408/153

*Primary Examiner*—Leonidas Vlachos

[57] ABSTRACT

The adjustable boring bar developed for metal working, and equipped with hard metal shifting tips consists of a boring bar shaft connected to the machine-tool, of a boring head adjustably guided as compared to the boring bar shaft and provided with shifting tip, as well as of elements fastening and adjusting the boring head. The boring bar shaft is provided with cylindrical bore including an angle with the symmetry line, as well as with radial slot, in the said bore a cylindrically developed boring head is located, on the cylindrical mantle of which flattening is to be found. Normal to the slot, setting and clamping element — e.g. pinned adjusting screw — is located. In the boring head, parallel to its centerline, an adjusting screw serving for the rough adjustment is to be found, whereas in the boring bar shaft a stop element — e.g. a dowel pin — of this adjusting screw can be found.

In order to achieve the fine adjustment, a fine adjusting device can be arranged in the boring bar shaft or in the boring head.

The adjustable boring bar renders possible the simple handling, the safe and vibration-free clamping, a wide adjustability of the diameter, thus the economic machining, and its production is inexpensive.

2 Claims, 14 Drawing Figures

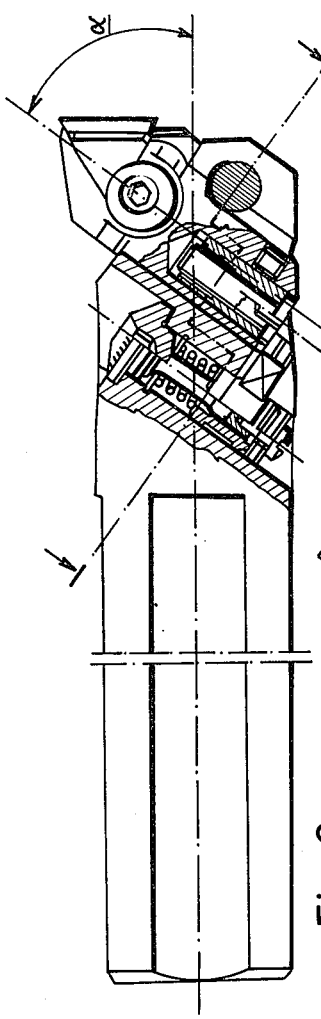
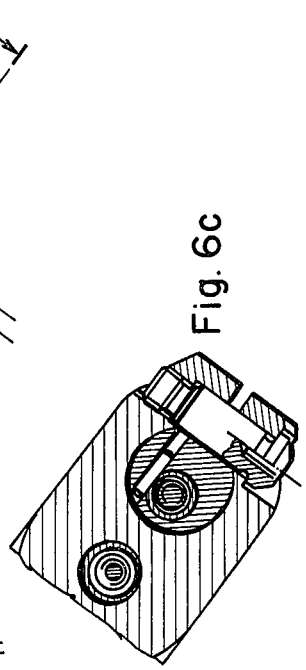
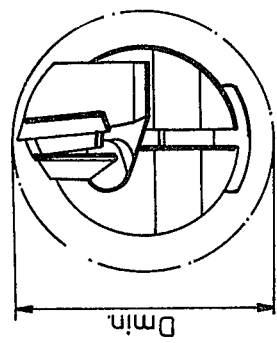
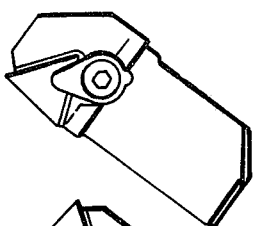
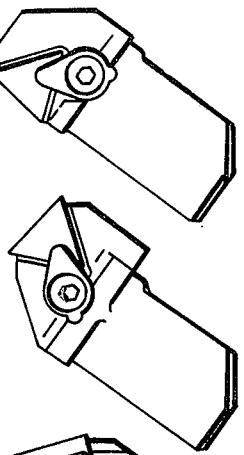
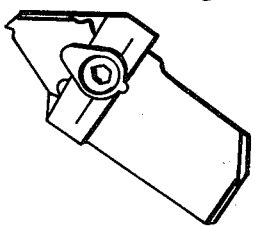
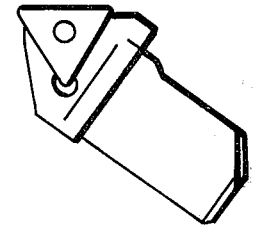
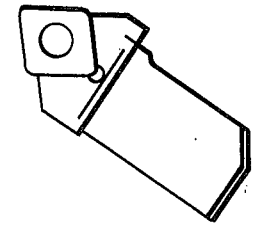

ADJUSTABLE BORING BAR PROVIDED WITH HARD METAL SHIFTING TIP FOR METAL WORKING

The object of the invention is an adjustable boring bar provided with hard metal shifting tip for rough-cutting and smoothing of metals, consisting of boring bar shaft connected to the machinetool, of a boring head adjustably guided as compared to the boring bar shaft and provided with shifting tip, as well as of elements fastening and adjusting the boring head.

In the up-to-date industry, especially in the machine industry rough cutting and smoothing the through holes and blind holes of work-pieces made of steel, steel casting, cast iron, light metal and non-ferrous, metal, boring bar sets provided with interchangeable boring heads and with hard metal shifting tips are used to the horizontal boring mills, milling machines, jig borers, NC-machines and the said boring bar sets are destined for ensuring the accurate vibration-free machining in the widest possible range of diameters with the least possible change of boring bar.

When developing the boring bar sets, the main aspects is to render possible the highly productive machining, i.e. to reduce the main and secondary times. The reduction of secondary times may be promoted among others by carrying out the change of boring heads in the shortest possible time - with an expedient tool construction.

Another endeavour is directed to cover a certain dimensional interval occurring most frequently in the practice by the aid of the least possible boring bars - that is to carry out the operation as inexpensive as possible, requiring the least possible replacement.

One of the most up-to-date boring bar currently used is developed so that each boring bar set consists of a boring bar shaft and of interchangeable boring heads. One end of the former is clamped in the machine-tool, namely in Morse-taper, steep-taper or cylindrical execution, according to the construction of the main spindle and the tool holder, respectively. To the other end of the bar the boring head is connected in such a way that a dovetail guide is made on the boring bar shaft, in which the dovetail part of the boring head seats. The boring bar shaft is provided with a slot starting from the dovetail guide, shifted from the symmetry line of the shaft and including an angle therewith, respectively, and the parts rendered springy — in this way can be tightened or released by means of retainer screw of internal spanner clearance practically normal to the slot and the clamping force can be transmitted to the dovetail guide, respectively. In the boring head — containing the shifting tip — an adjusting set screw of internal spanner clearance and of close fit is located by means of which the radial rough adjustment of the boring head in the dovetail guide as compared to the boring bar shaft can be carried out /see e.g. USA patent specifications Nos. 2.998.736; 3.013.450 and 3.433.104/.

For precision machining also a boring bar construction is known in which the cutting tip is arranged on the fine adjusting device built in into the boring head. Thereby the adjustment accuracy required in the machine industry may be achieved /see USA patent specification No. 3.176.969/.

The drawbacks of the above mentioned known solutions consists in that the dovetail guide has fitting errors since the dovetail guide rendered springy fits theoretically only in one single position along planes and the achievement of this position requires in the practice the observance of highly severe accuracy of manufacture. Just as a consequence thereof it often occurs that the face of the boring bar shaft and that of the boring head are not smooth enough and seat on each other at several scattered points. Thus, the three-point contact necessary for the stability is established not always in the most convenient position, consequently vibration may occur during the machining, highly decreasing the quality of the machined surface as well as the accuracy to dimension of the bore and the durability of the tip.

It follows from the above drawbacks that the dovetail guide is highly sensitive to the reduction of the clamping length which means that even in case of a very small reduction of the clamping length the dovetail guide loses its rigidity whereby the adjustability of boring head is highly reduced that is the range to be machined with one set is narrow.

A further drawback of the above mentioned known boring heads consists in that the adjusting set screw of close fit located in the boring head will become of clearance fit due to the wear occurring with the use so that after a replacement the boring head will not return accurately into its original position.

A disadvantage of the above mentioned fine boring unit is that the ground threaded spindle is not protected against contaminations, therefore it may occur that the cutting tip moves off not by a value adjusted on the vernier scale and thus, the accuracy of the bore cannot be guaranteed in each case. The fine boring unit shall be therefore carefully cleaned. With the fine boring units of boring heads suitable for the boring of small bores the clamping of the shifting tip is not reliable enough — due to the necessarily small dimensions — it occurs namely that when withdrawing after boring, the shifting tip moves off in its holder which causes a dimensional change with repeated boring.

The present invention aims at the elimination of the above drawbacks. The objective of the invention is the provision for a rigid tool clamping in a relatively wide machining range. The device is simple, consists of easily workable components, its manageability is simple and safe, whereby the productional costs and the secondary times are reduced.

The above mentioned aim and requirements are achieved according to the invention so that the boring bar shaft is provided with a cylindrical bore including an angle — expediently an acute angle — with the symmetry line, as well as with a slot radial with respect to the said bore. In the bore the cylindrically developed part of the boring head is arranged, on the cylindrical mantle of which flattening/s/ is /are/ to be found. Normal to the slot, setting and clamping element — e.g. pinned adjusting screw — is arranged. In the boring head adjusting screw serving for the longitudinal rough adjusting of the boring head is built in, whereas in the boring bar shaft the stop element of this screw — e.g. a dowel pin — is to be found.

With respect to the safety of the fine adjustment, a further advantage is provided for by an embodiment, in which in the boring bar shaft parallel to the boring head a fine adjusting device suitably protected against contaminations is built in, being in rigid coupling with the stop element of the rough adjusting screw of the boring head. The fine adjusting device according to the invention is used especially advantageously with the small boring bars since in this case also the fix clamping of the shifting tip is ensured.

In case of this latter solution it is expedient to apply a longitudinally arranged coil spring in the fine adjusting device in order to achieve the clearance-free adjustment. This coil spring bears up against the threaded sleeve arranged displaceably in the boring bar shaft, on the one hand, and against the washer fastened similarly in the boring bar shaft, on the other hand. The value of the radial displacement of the said threaded sleeve — and simultaneously of the cutting tip — is indicated by the scale division on the head of the threaded spindle with an accuracy required for the observance of the allowances usual in the engineering industry, and renders the setting of this value possible, respectively.

Since the cylindrical clamping of the boring head ensures the bearing with the entire surface and thus, the proper rigidity, the solution according to the invention renders possible the vibration-free work even if the clamped length of the boring head shaft is of 1–1.2 d value, where d is the cylindrical diameter of the cylindrical boring in the boring bar shaft, and of the boring head, respectively. In this way, a wider range of diameters can be covered with a boring bar set.

The fit of the rough adjusting screw of the boring head in the slotted threaded sleeve is adjusted to an optional value /tight or slack/, whereby the return in case of replacement of the boring head is ensured with a high accuracy.

The invention will be now introduced more detailed in connection with some exemplified embodiments, by means of figures, where FIG. 1 shows an embodiment of the boring bar according to the invention, partly in section;

FIG. 2 is the section along the line A—A of FIG. 1,

FIG. 3 indicates another embodiment, partly in section similarly to FIG. 1,

FIGS. 6a–6i shows an embodiment suitable for machining of smaller bores, with different variations of the tip arrangement and clamping.

Figure 1:
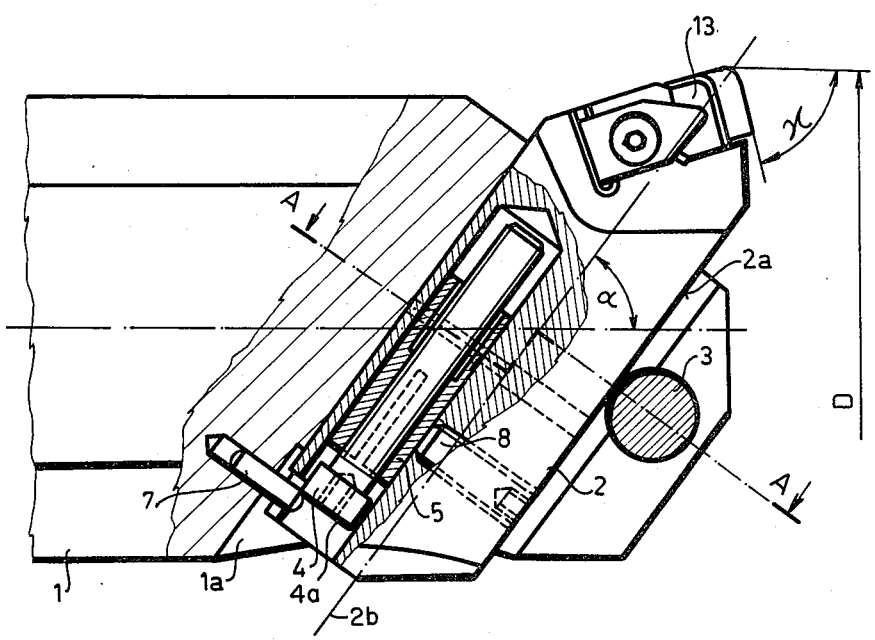
Figures 2, 5:
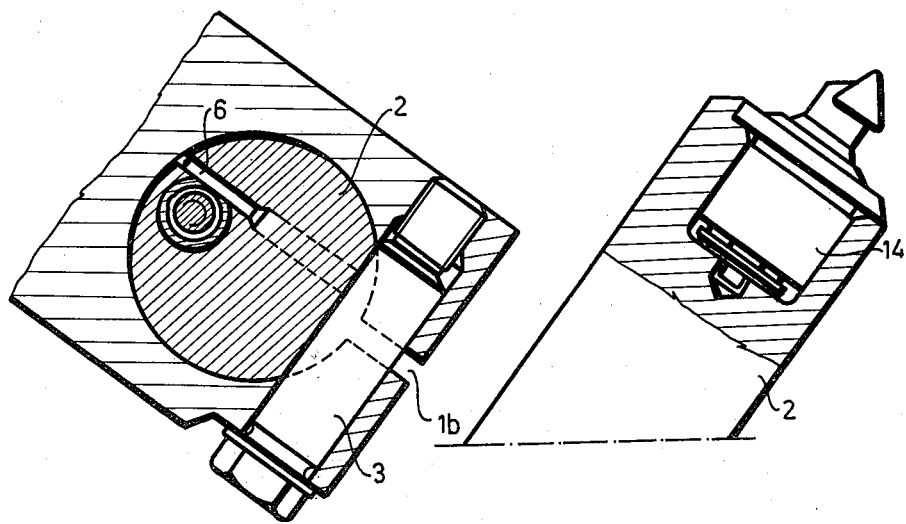
FIG. 5 illustrates a variant of the boring bar according to FIG. 1, on the boring head of which the known fine adjusting device is arranged.

Returning to the embodiment shown in FIGS. 1 and 2, in the vicinity of the end remote from the machine tool of the boring bar shaft 1 a cylindrical bore 1a is to be found which includes an angle with the axis of the boring bar shaft 1. The boring bar shaft 1 can be connected to the machine-tool by a Morse-metric taper, steep taper or cylindrical construction according to the development of the main spindle and tool holder of the machine-tool.

In the bore 1a the boring head 2 is arranged the cylindrical mantle having an axis 2b of which is provided with flattening 2a. At the end of the boring bar shaft 1 a slot 1b radial as compared to the bore 1a is to be found, normal to which a bore and therein a pinned adjusting screw 3 is arranged. The pinned adjusting screw 3 has a double function. It provides for the clamping force to the cylindrical boring head 2, on the one hand, and compliment with the flattening 2a of the boring head 2, it determines the accurate angle position of the cutting edge of the shifting tip 13 arranged on the protruding end of the boring head 2, on the other hand.

The inclined location of the boring head 2 renders possible that the boring bar set be suitable for the machining of through holes and blind holes by the simple change of boring heads 2.

A slotted threaded sleeve 5 is located and fastened by the locating pin 6 in the longitudinal bore made in the boring head 2. In this slotted threaded sleeve 5 the rough adjusting screw of internal spanner clearance 4 having end 4a is run in, for the stopping of which a dowel pin 7 fastened in the bore made in the boring bar shaft 1 is provided. The fitting of the adjusting screw 3 can be varied — that is rendered tighter or slacker — with the set screw 8 arranged in the boring bar shaft 1, by means of which a compressive force is exerted onto the slotted threaded sleeve 5. In this way it is possible that in case of change, the boring head 2 could be replaced highly accurately in the boring bar shaft 1 for machining with in the allowance values of fit usual in the engineering industry /IT6, IT7/.

Figure 3:
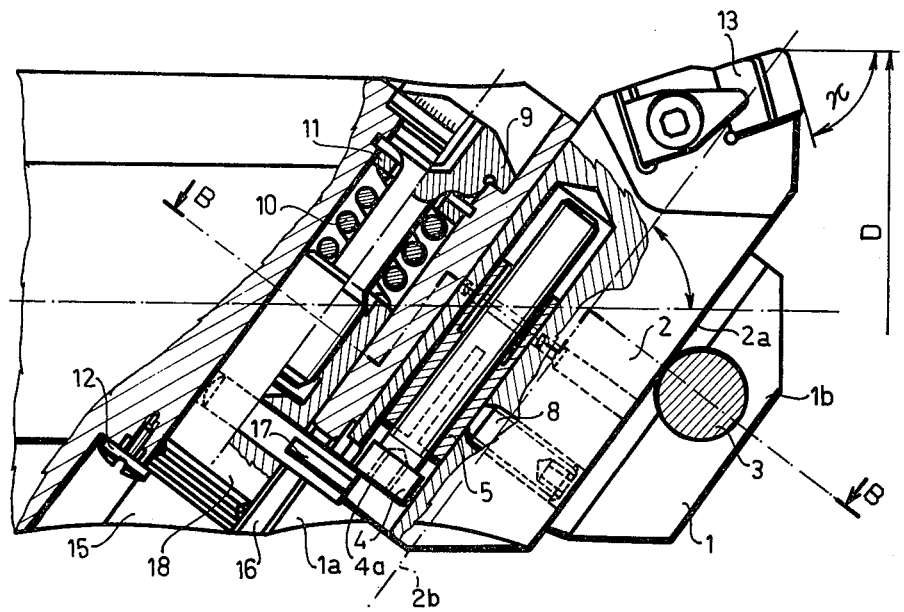
Figure 4:
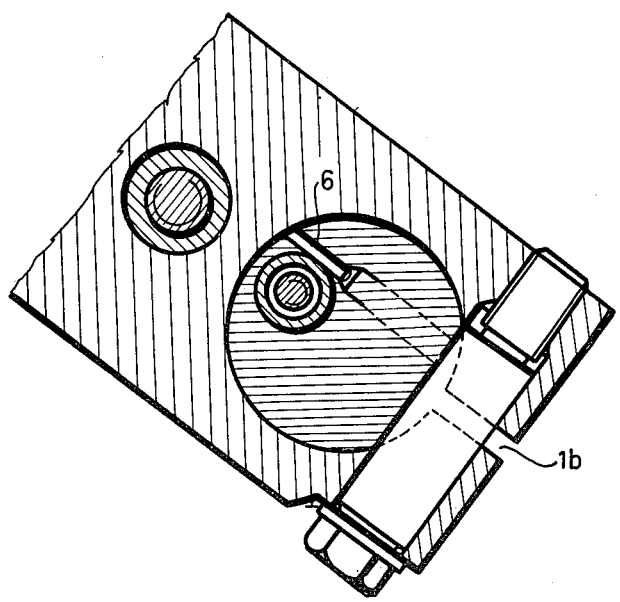
FIG. 4 shows the section along the line B—B of FIG. 3.

With the embodiment shown in FIGS. 3 and 4 the fine adjustment of the boring head 2 can be carried out by means of the fine adjusting device built in into the boring bar shaft 1 so as to be protected against the contaminations. In the boring bar shaft 1 the head of the threaded spindle 9 bears up against the upper shoulder of the through hole 15 parallel to the boring head 2. The threaded end of the threaded spindle 9 is screwed in into the thread of the threaded sleeve 18 located with sliding fit in the through hole 15. The clearance-free, unidirectionally prestressed fit of the threaded parts is ensured by the coil spring 10 which bears up with one end against the washer 11 fixed with a circlip in the through hole 15, whereas with its other end against the upper shoulder of the threaded sleeve 18, prestressing in this way in one direction the thread of the threaded spindle 9 and that of the threaded sleeve 18. In the threaded sleeve 18 the dowel pin 17 displacing in the slot 16 is fixed, serving for the stop of the adjusting screw 4. The downwards movement of the threaded sleeve 18 is limited by the stop screw 12.

With this latter solution the rough adjustment is carried out with the adjusting screw 4, whereas the fine adjustment with the above mentioned fine adjusting device, and with the scale division on the head of the threaded spindle 9, respectively.

The embodiment shown in FIG. 5 is characterized in that at the end protruding from the boring bar shaft 1 of the boring head 2 a fine adjusting device 14 is arranged by means of which the cutting tip fastened thereto can be adjusted to the accurate size. The fine adjusting device 14 will now be described more detailed since it may be a system already known.

In FIGS. 6a–6i an effectuated embodiment suitable for the machining of smaller bores is illustrated. The known variations of tools equipped with shifting tip can be applied in the boring head. The rigid clamping of the boring head renders possible the use of high-power tips of negative incorporation, of positive true rake angle, of sign TNMM, CNMM according to the IDO marking in the small bores. It may be required e.g. with horizontal boring mills during the machining that the feed should be directed towards the clamping spots of the boring bar, e.g. in order to adhere the uniaxiality allowances in case of shoulder holes or in case of chamfering. The rigid clamping of the boring head renders possible also this variation, as it is to be seen in FIGS. 6a–6i. The boring bar according to the invention is a general purpose boring tool to be manufactured both in right-handed and left-handed execution. Its field of application may be manysided. It is suitable for machining of bores on NC-machines and for turning of the outer surfaces in NC-turret head. It is easy to see from FIGS. 6a–6i that the boring bar according to the invention can be used without adjusting devices to the traditional lathes for machining of holes in case of both individual or workshop works. The production costs of the boring heads are considerably lower than those of boring tool provided with solid shifting tips. The change of boring head can be carried out surprisingly quickly without removing the boring bar shaft from the tool holder, therefore when machining bores, where shoulders, recessing, thread cutting, chamfering, etc. are required, the said operations can be carried out with short secondary time.

The invention is not restricted to the examples shown in figures but it can be realized in several variations in the framework of the claims, without leaving the range of protection.

With the boring bar developed according to the invention the limit and degree, respectively, of the adjustability is higher than with the known solutions. Thus, e.g. with one of the known set the adjustability limit of one head is between 89 and 116 mm, while with the boring bar according to the invention the same range is to be found between 89 and 142 mm. For the clamping of suitable rigidity of the boring head one retainer screw is sufficient, whereas with said system two retainer screws are required for the same dimensional range. Therefore, the fixing and change as well as adjustment of the boring head are more safe and rigid, its operation is more simple than with the known solution, resulting in the reduction of the secondary times during its use.

The adjustable boring bar according to the invention is simpler and less expensive than that in the known solutions; the boring head in which the shifting tips and the fine adjusting device containing the fit, respectively, are located, is a cylindrical body easily fabricated of rolled steel alloy in case of large-size boring bars.

The seat of the shifting tip in the boring head can be machined also directly — like with the known solutions — in case of larger boring bars /over 140 mm/, however, the boring head and the tip holder should be expediently produced of separate pieces.

On the cylindrical mantle of the boring head, instead of the single flattening according to the drawing, even two or more ones can be provided for, in order to avoid the overcertainty of the bearing.

What we claim is:

1. An adjustable boring bar for coarse and for fine machining comprising:
    a boring bar shaft (1) connectable to a machine tool, the shaft having a cylindrical bore (1a) disposed at an angle with the geometrical axis of the boring bar shaft (1);
    a boring head (2) disposed in said bore (1a) and including a shifting tip (13) disposed in an end of the boring head (2) and a cylindrical mantle receivable in the cylindrical bore (1a), said cylindrical mantle having a flattened portion (2a) which is parallel to the centerline of the boring head (2);
    means mounting the boring head in the cylindrical bore (1a) of the boring bar shaft (1) for positioning and orienting edges of the shifting tip (13), including a first adjusting screw (3) for providing the force necessary for the fastening of the cylindrical mantle of the boring head (2) and further including a radial slot (1b) in the boring bar shaft (1), said slot (1b) extending from an end portion of the boring bar shaft (1) which points toward the workpiece and intersects the entire length of the cylindrical bore (1a) and wherein a portion of said screw (3) penetrates said bore (1a) in a chord-like fashion perpendicular to said slot (1b) and wherein said portion of said screw (3) is parallel to the flattened portion (2a) on the cylindrical mantle of the boring head (2);
    a second adjusting screw (4) for coarse adjustment of the boring head (2) disposed in the mantle of the boring head (2) parallel to and displaced from the axis of said mantle, an end portion (4a) of said second adjusting screw (4) pointing outwardly from the mantle of the boring head; and
    a dowel pin limiting member (7, 17) having one fixed end portion and the other end portion extending into the cylindrical bore (1a) and abutting against the end portion (4a) of the second adjusting screw (4).

2. The adjustable boring bar of claim 1 further comprising means mounting the limiting member (17) for fine adjustment of the boring head to a predetermined position in the direction of the axis (2b) of the boring head (2), said means including an aperture (16) communicating with the cylindrical bore (1a) with said limiting member (17) disposed within said aperture and a fine adjusting element (18) integral with said limiting member (17).

* * * * *